J. E. GABLE.
AUTOMOBILE.
APPLICATION FILED JULY 27, 1908.
949,422.
Patented Feb. 15, 1910.
2 SHEETS—SHEET 1.
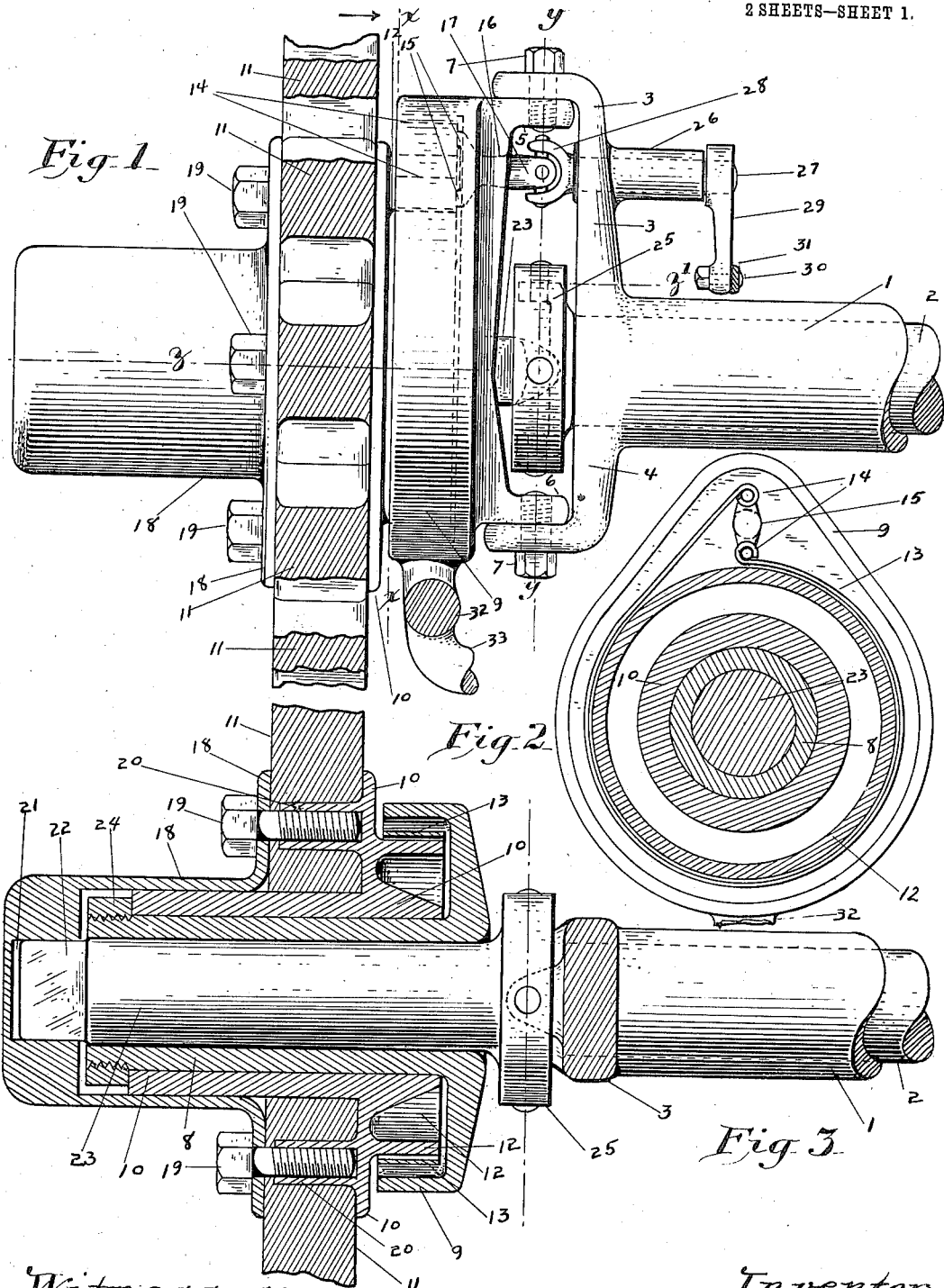
Witnesses:
William F. Smith
A. L. Ekvall
Inventor:
John E. Gable,
By Joshua R. H. Potts
Attorney

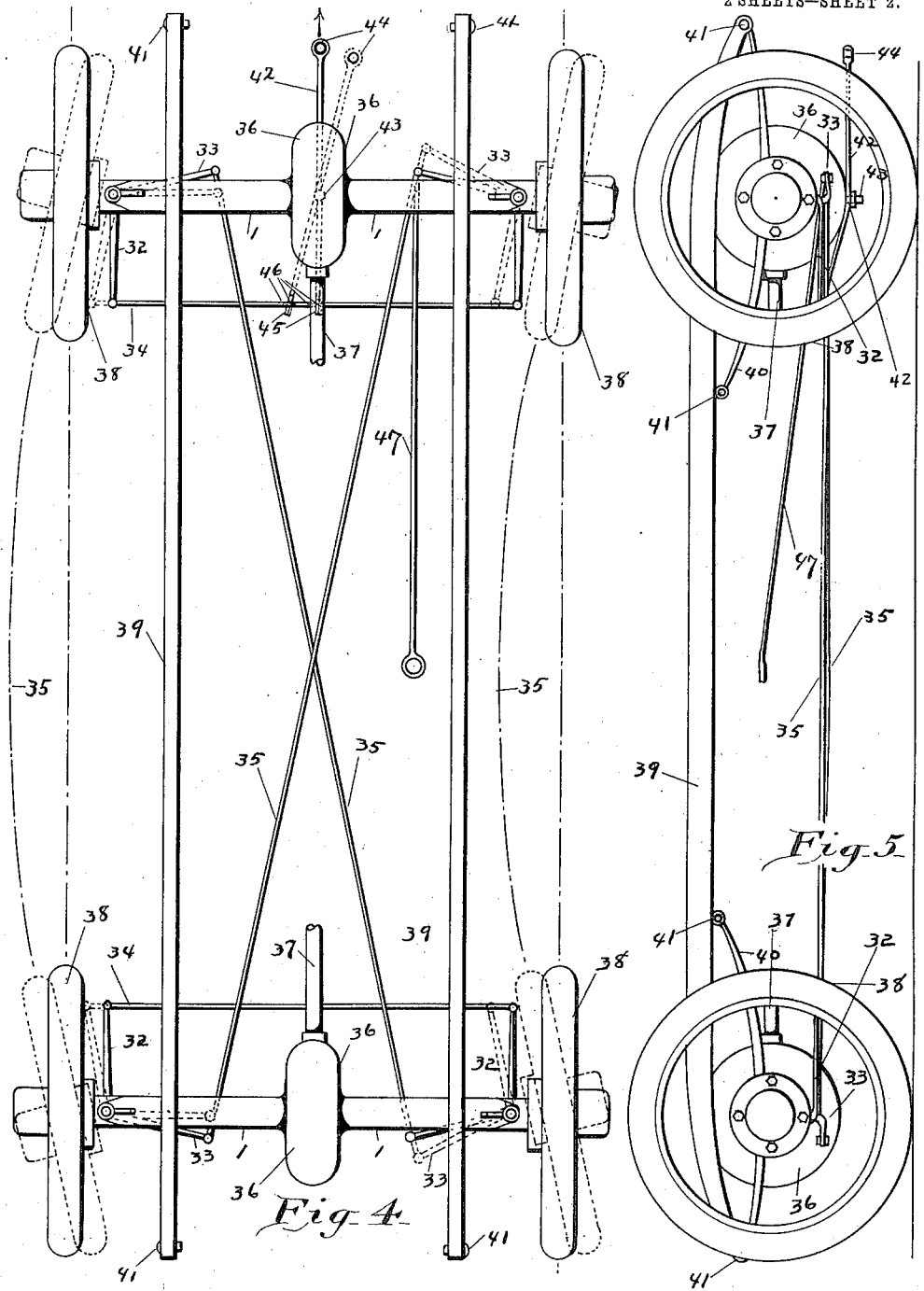

UNITED STATES PATENT OFFICE.

JOHN E. GABLE, OF EVANSTON, ILLINOIS.

AUTOMOBILE.

949,422.  Specification of Letters Patent.  Patented Feb. 15, 1910.

Application filed July 27, 1908. Serial No. 445,459.

*To all whom it may concern:*

Be it known that I, JOHN E. GABLE, a citizen of the United States, residing at Evanston, county of Cook, and State of Illinois, have invented certain new and useful Improvements in Automobiles, of which the following is a specification.

My invention relates to improvements in automobiles, and more particularly to propelling and steering means in an automobile chassis.

In an ordinary automobile propelled by the rear wheels only, skidding often occurs on slippery pavements since the tractive force of two wheels is inadequate to maintain the car in a straight course. Excessive wear of the propelling wheel tires and the driving mechanism is also incident to the ordinary construction.

The object of my invention is to overcome these difficulties by providing means for power distribution to all four wheels of an automobile, and by providing means whereby each wheel may not only drive, but aid in steering the car.

A further object of my invention is to provide interconnecting means in such a manner that all four wheels may be governed by a single steering means, and a further object is to provide braking means on each wheel of the car, and suitable means of connection thereto.

Other objects will appear hereinafter.

With these objects in view my invention consists in an automobile chassis provided with four propelling and steering wheels connected with the axles by means of knuckles and universal joints, the locus of the center of rotation in each of the latter lying in an axis of a steering knuckle.

Steering of the car is effected by means of a mutual interconnecting means between the knuckles and connection to an operating steering wheel. And the propelling power of the car is transmitted through shafts having universal joints connected with the wheels, said joints being located as aforesaid.

My invention further consists in brake drums integral with each wheel having universal joint connection to operative means in the car, the locus of the center of rotation in each of these joints lying in the axis of the steering knuckle.

My invention further consists in connecting means whereby the car when disabled may be drawn as a trailer by any other car. And my invention further consists in certain details of construction and arrangements of parts all as will be hereinafter fully described and particularly pointed out in the claim.

My invention will be more readily understood by reference to the accompanying drawings forming a part of this specification, and in which, Figure 1 is a detail side elevation showing the main feature of my invention in its preferred form, Fig. 2 is substantially a detail vertical transverse section taken on the line *x—x* of Fig. 1, Fig. 3 is a detail partial top elevation and horizontal longitudinal section, Fig. 4 is a plan view showing the steering and driving connections, and Fig. 5 is a side elevation.

Referring now to the drawings, 1 indicates a tubular axle, and 2 a driving shaft journaled therein. Steering knuckle arms 3 and 4 are integral with the axle 1, said arms being pivoted to ears 5 and 6, respectively, by means of cap-screws 7. The ears 5 and 6 are integral with a tubular axle arm 8 provided with the flange 9. The axle arm 8 is journaled in the wheel hub 10, and the spokes 11 are rigidly secured in the hub 10. The annular brake drum 12 is integral with the hub 10 and is adapted to receive the brake band 13, the latter being provided with eyes 14 pivoted to arms of a fork 15 which is integral with a shaft 16 and one member 17 of a universal joint. The hub cap 18 is detachably secured to the spokes 11 by means of the cap-screws 19, the latter being secured in threaded sleeves 20 integral with the hub 10. The interior of the cap 18 is provided with a square recess 21 adapted to receive a squared end 22 of the propelling shaft 23. A hub retaining nut 24 is provided on the axle arm 8.

In order to remove the wheel for oiling or other purposes, the cap-screws 19 must be removed, when the cap 18 may be detached and the retaining nut 24 screwed off.

From the foregoing, it is clear that the shaft 23 is adapted to transmit power to the hub 10 and to the wheel itself. The inner end of the shaft 23 has connection with an ordinary universal joint 25 whose center of rotation lies in the axis of the steering knuckle, as shown. The driving shaft 2 is connected to the universal joint 25 and through it is adapted to drive the shaft 23 in any position of same. A sleeve 26 integral with the arm 3 is adapted to receive the shaft 27 which is provided with a member 28 of a universal joint, the members 17 and 28 being forks of an ordinary universal joint, the center of which lies in the axis of the steering knuckles, as shown.

It is obvious that instead of being means to operate a brake, the shaft 16 may be provided with a driving pinion in place of the fork 15 adapted to mesh with a gear in place of a brake drum 12, this modification not being deemed the best form of drive however. A lever 29 secured to the shaft 27 is provided with a screw 30 to which an operating rod 31 is pivoted. Lever arms 32 and 33 are integral with the flange 9 and are pivoted to the rods 34 and 35, respectively. The rods 34 are ordinary connecting rods or drag links, and the rods 35 are adapted to cross, as shown, in order to reverse the steering action of the front and rear wheels. In this arrangement of steering with all four wheels there is a minimum of angularity of the wheels with the axles in making turns, this feature being important since the efficiency of universal joints decreases when the connected shafts are not in alinement. The broken lines 35 represent the curvature of the direction of movement of the car when the wheels are in the position shown. The shafts 2 may extend to the ordinary differential gear-housing 36, and be connected to longitudinal driving shafts 37 in the usual manner. The wheels 38 are arranged as shown and the frame members 39 are connected to the axles 1 by means of springs 40 and the bolts 41. A lever 42 having a central pivot 43 is provided with an eye 44 and a fork 45 adapted to engage the rod 34 between pins 46 secured in the rod 34. Thus it is obvious that when the car acts as a trailer that the wheels assume a position corresponding to the direction of movement of the car. The rod 47 pivoted to the lever 33 may have connection with the car steering wheel in the usual manner.

While I have shown what I deem to be the preferable form of my invention, I do not wish to be limited thereto as there might be many changes made in the arrangement of parts and details of construction without departing from the spirit of my invention.

Having described my invention what I claim as new, and desire to secure by Letters Patent, is:

In an automobile the frame and a front and a rear tubular axle fixed thereto, in combination with a tubular wheel spindle arranged at the outer ends of each of said axles, knuckle-joints connecting said spindles to said axles, wheels mounted on said spindles, a drive shaft arranged in each of said axles, a short shaft arranged in each of said spindles and connected to the wheels, universal joints connecting each of said drive shafts with the respective short shafts, a brake housing on each of said spindles upon its respective spindle portion of the knuckle-joint, a pair of arms rigidly fixed to each of said housings, one of said arms extending inwardly and the other parallel with its respective wheel, a rod connecting the inwardly extending arm of each front wheel with the inwardly extending arm of the rear wheel on the opposite side, drag links connecting the parallel arms of the front wheels, and the parallel arms of the rear wheels, a steering rod connected to one of said inwardly extending arms, a centrally pivoted draw lever at the forward end of said frame, said lever having an eye at the forward end and provided with a fork at its rear end whereby it is secured to the forward drag link, substantially as described.

In testimony whereof I have signed my name to this specification in the presence of two subscribing witnesses.

JOHN E. GABLE.

Witnesses:
   JANET E. HOGAN,
   HELEN F. LILLIS.